United States Patent Office 3,530,178
Patented Sept. 22, 1970

---

3,530,178
[4 - (2 - ALKYLIDENEACYL)PHENOXY] ALKANOIC ACID ANHYDRIDES AND THEIR PREPARATION
Everett M. Schultz, Ambler, and Edward J. Cragoe, Jr., Lansdale, Pa., assignors to Merck & Co., Inc., Rahway, N.J., a corporation of New Jersey
No Drawing. Filed May 1, 1967, Ser. No. 634,870
Int. Cl. C07c 51/56, 63/60
U.S. Cl. 260—546    11 Claims

ABSTRACT OF THE DISCLOSURE

[4 - (2 - alkylideneacyl)phenoxy]alkanoic acid anhydrides, a class of compounds possessing diuretic and saluretic properties for use in treating conditions associated with electrolyte and fluid retention and prepared by reacting the precursor or starting acids with a dehydrating agent in an anhydrous solvent and then separating out the anhydrides thus formed.

---

This invention relates to [4-(2-alkylideneacyl)-phenoxy]alkanoic acid anhydrides and a method of preparing the same. The anhydride products have the following general formula:

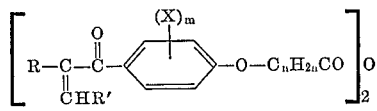

wherein R is a straight or branched chain lower alkyl radical such as methyl, ethyl, propyl, isopropyl and the like or trifluoromethyl substituted lower alkyl such as 2,2,2 - trifluoroethyl, 2,2,2 - trifluoroisopropyl, etc.; R' is hydrogen or a straight or branched chain lower alkyl radical; X represents similar or dissimilar members selected from among hydrogen, a straight or branched chain lower alkyl radical or halogen such as chlorine, bromine, iodine or fluorine, and when taken together two X radicals on adjacent carbon atoms of the benzene ring may be joined to form the 1,3-butadienylene linkage, i.e., —CH=CH—CH=CH—; $m$ is an integer from 1-4 and $n$ is an integer from 1-4.

The products of this invention are diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions usually associated with edema.

A preferred embodiment of the invention, i.e., those compounds which possess the greatest diuretic and saluretic activity, are the [4-(2-methyleneacyl)phenoxy]acetic acid anhydrides which have the following general formula:

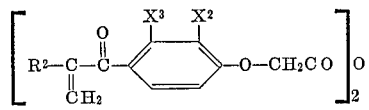

wherein $R^2$ is a straight or branched chain lower alkyl radical; $X^2$ and $X^3$ are similar or dissimilar members selected from among hydrogen, a straight or branched chain lower alkyl radical, halogen or when taken together with the carbon atoms of the benzene ring to which they are attached they may be joined to form a 1,3-butadienylene linkage.

The instant compounds can be prepared by the reaction of the starting or precursor acid with a dehydrating agent in an inert anhydrous solvent, i.e., a solvent for the acid, dehydrating agent and product anhydride, in accordance with the reaction:

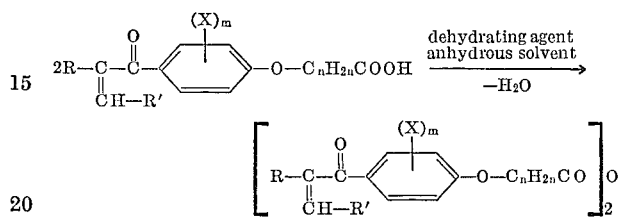

wherein R, R', X, $m$ and $n$ are the same as defined herebefore. The compound is then separated from the reaction mixture and, if desired, may be purified by recrystallization from a suitable solvent.

Examples of suitable dehydrating agents are dicyclohexylcarbodiimide, di-p-tolylcarbodiimide, diphenylcarbodiimide, etc. Examples of suitable anhydrous solvents are methylene chloride, chlorinated hydrocarbons such as chloroform, tetrachlorethane, etc., hydrocarbons such as benzene, toluene, etc., ethers such as ethyl ether, isopropyl ether, etc. The products may also be purified by recrystallization from non-polar solvents such as an ether-petroleum ether mixture, cyclohexane, etc.

Illustrative, but non-limitative, examples of the preparation of the instant compounds are as follows:

EXAMPLE 1

[2,3-dichloro-4-(2-methylenebutyryl)phenoxy]acetic acid anhydride

To a stirred solution of [2,3-dichloro-4-(2-methylenebutyryl)phenoxy]acetic acid (12.21 g., 0.04 mole) in anhydrous methylene chloride (120 ml.) is added dicyclohexylcarbodiimide (4.12 g., 0.02 mole) in anhydrous methyl chloride (30 ml.). The reaction mixture is stirred for 1¼ hours, filtered (to remove the precipitated 1,3-dicyclohexyl-urea) and the solvent removed by distillation at reduced pressure. The residual oil is dissolved in ether (50 ml.) filtered, and cooled in Dry Ice which causes 7.6 g. (65%) of [2,3-dichloro-4-(2-methylenebutyryl)phenoxy]acetic acid anhydride to precipitate. The product melts at 80° C. after recrystallization from a mixture of ether (200 ml.) and petroleum ether (100 ml.).

*Analysis.*—Calc'd for $C_{26}H_{22}Cl_4O_7$ (percent): C, 53.08; H, 3.77; Cl, 24.11. Found (percent): C, 53.02; H, 3.77; Cl, 24.07.

All of the products of this invention may be obtained in a manner similar to that described in Example 1 for the preparation of [2,3-dichloro-4-(2-methylenebutyryl)phenoxy]-acetic acid anhydride by substituting the appropriate precursor, i.e., starting acid, for the [2,3-dichloro-4-(2-methylenebutyryl)phenoxy]acetic acid of Example 1 and following the procedure described therein.

The following table lists examples of products of the invention prepared in accordance with the aforesaid method and which fall within the following general formula:

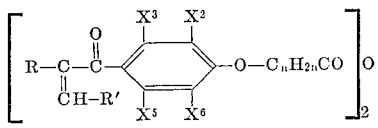

wherein R, R', $X^2$, $X^3$, $X^5$, $X^6$ and $C_nH_{2n}$ are as indicated in the following table.

EXAMPLE 19

Dry-filled capsules containing 100 mg. of active ingredient per capsule

| | Mg. per capsule |
|---|---|
| [2,3 - dichloro - 4 - (2 - methylenebutyryl)phenoxy] acetic acid anhydride | 100 |
| Lactose | 94 |
| Magnesium stearate | 6 |
| Capsule size No. 3 | 200 |

TABLE

| Ex. | R | R' | $X^2$ | $X^3$ | $X^5$ | $X^6$ | $-C_nH_{2n}-$ |
|---|---|---|---|---|---|---|---|
| 2 | $-C_2H_5$ | H | H | Cl | H | H | $-CH_2-$ |
| 3 | $-C_2H_5$ | H | $-CH_3$ | $-CH_3$ | H | H | $-CH_2-$ |
| 4 | $-C_2H_5$ | H | $-CH=CH-$ | $-CH=CH-$ | H | H | $-CH_2-$ |
| 5 | $-C_2H_5$ | H | Cl | $-CH_3$ | H | H | $-CH_2-$ |
| 6 | $-C_2H_5$ | H | $-CH_3$ | Cl | H | H | $-CH_2-$ |
| 7 | $-C_2H_5$ | H | H | Cl | H | H | $-CH[CH(CH_3)_2]-$ |
| 8 | $-CH-CH_3$ \| $CF_3$ | H | H | $-CH_3$ | H | H | $-CH_2-$ |
| 9 | $-CH-CH_3$ \| $CH_3$ | H | H | Cl | H | H | $-CH_2-$ |
| 10 | $-CH-CH_3$ \| $CH_3$ | H | Cl | Cl | H | H | $-CH_2-$ |
| 11 | $-C_2H_5$ | H | H | $-CH_3$ | H | H | $-CH_2-$ |
| 12 | $-C_2H_5$ | $-CH_3$ | Cl | Cl | H | H | $-CH_2-$ |
| 13 | $-CH-CH_3$ \| $CH_3$ | $-CH_3$ | H | Cl | H | H | $-CH_2-$ |
| 14 | $-C_2H_5$ | H | $-CH_3$ | $-CH_3$ | $-CH_3$ | H | $-CH_2-$ |
| 15 | $-C_2H_5$ | H | $-CH_3$ | $-CH_3$ | $-CH_3$ | $-CH_3$ | $-CH_2-$ |
| 16 | $-C_2H_5$ | H | H | Br | H | H | $-CH_2-$ |
| 17 | $-C_2H_5$ | H | Br | Cl | H | H | $-CH_2-$ |
| 18 | $-C_2H_5$ | H | H | Cl | H | H | $-CH(CH_3)-$ |

The starting acids for the preparation of the anhydride products are described in U.S. Pat. No. 3,255,241 and U.S. Pat. No. 3,255,242, both issued June 7, 1966.

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products can be prepared by mixing 100 mg. of a [4-(2-alkylideneacyl)phenoxy]alkanoic acid anhydride with 94 mg. of lactose and 6 mg. of magnesium stearate, and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the instant compounds by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is illustrative of the preparation of a representative dosage form:

The [2,3-dichloro-4-(2-methylenebutyryl)phenoxy] acetic acid anhydride is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the [4-(2-alkylideneacyl)phenoxy]acetic acid anhydrides of the instant invention constitute a valuable class of compounds which have not hitherto been prepared. One skilled in the art will also appreciate that the processes disclosed in the above examples are merely illustrative and are capable of variation and modification without departing from the spirit of the invention.

What is claimed is:

1. A compound of the general formula:

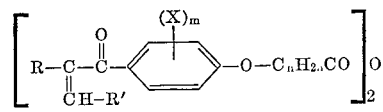

wherein R is selected from the group consisting of straight or branched chain lower alkyl, and trifluoromethyl substituted lower alkyl; R' is selected from the group consisting of hydrogen and straight or branched chain lower alkyl; X represents similar or dissimilar members selected from among hydrogen, halogen and straight or branched chain lower alkyl and, when taken together, two X radicals on adjacent carbon atoms of the benzene ring may be joined to form a 1,3-butadienylene linkage; $m$ is an integer from 1–4; and $n$ is an integer from 1–4.

2. A compound of the general formula:

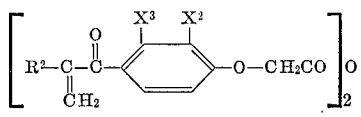

wherein $R^2$ is selected from the group consisting of straight or branched chain lower alkyl; and $X^2$ and $X^3$ represents similar or dissimilar members selected from among hydrogen, halogen and straight or branched chain and, when taken together with the carbon atoms of the benzene ring to which they are attached, they may be joined to form a 1,3-butadienylene linkage.

3. The compound of claim 2 wherein $R^2$ is ethyl, $X^2$ is hydrogen and $X^3$ is chlorine.

4. The compound of claim 2 wherein $R^2$ is ethyl and $X^2$ and $X^3$ are methyl.

5. The compound of claim 2 wherein $R^2$ is ethyl and $X^2$ and $X^3$ are joined to form a 1,3-butadienylene linkage.

6. The compound of claim 2 wherein $R^2$ is ethyl, $X^2$ is chlorine and $X^3$ is methyl.

7. The compound of claim 2 whereis $R^2$ is ethyl and $X^2$ and $X^3$ are chloride.

8. The process of making an anhydride of the general formula:

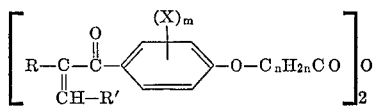

wherein R is selected from the group consisting of straight or branched chain lower alkyl and trifluoromethyl substituted lower alkyl; R' is selected from the group consisting of hydrogen and straight or branched chain lower alkyl; X represents similar or dissimilar members selected from among hydrogen, halogen and straight or branched chain lower alkyl and, when taken together, two X radicals on adjacent carbon atoms of the benzene ring may be joined to form the 1,3-butadienylene linkage; $m$ is an integer from 1–4; and $n$ is an integar from 1–4; which comprises the reaction of the acid form of the product with a dehydrating agent selected from among di-cyclohexylcarbondiimide, di-p-tolylcarbondiimide, and diphenylcarbodiimide, in the presence of an anhydrous solvent, removing the solvent and crystallizing out the anhydride from the residue.

9. The process of making an anhydride of the general formula:

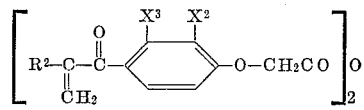

wherein $R^2$ is selected from the group consisting of straight or branched chain lower alkyl; and $X^2$ and $X^3$ represents similar or dissimilar members selected from among hydrogen, halogen and straight or branched chain and, when taking together with the carbon atoms of the benzene ring to which they are attached, they may be joined to form the 1,3-butadienylene linkage; which comprises the reaction of the acid form of the product with a dehydrating agent selected from among dicyclohexylcarbodiimide, di-p-tolylcarbodiimide, and diphenylcarbodiimide, in the presence of anhydrous solvent, removing the solvent and crystallizing out the anhydride from the residue.

10. The process of claim 9 wherein the dehydrating agent is a carbodiimide.

11. The process of claim 9 wherein the starting acid is [2,3-dichloro - 4 - (2-methylenebutyryl)phenoxy]acetic acid, the dehydrating agent is dicyclohexylcarbodiimide and the solvent is methylene chloride.

References Cited

UNITED STATES PATENTS 3,130,206   4/1964   Richter _____ 260—347.4
3,166,586   1/1965   Carrara _____ 260—479

JAMES A. PATTEN, Primary Examiner

P. J. KILLOS, Assistant Examiner

U.S. Cl. X.R.

424—317